July 8, 1924.  
C. G. OSTEMAN  
BEARING  
Filed Dec. 29, 1921
1,500,523
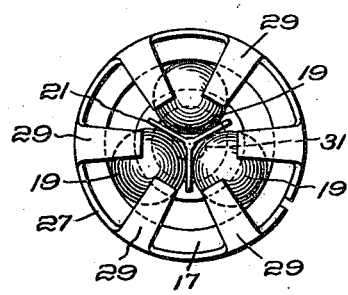
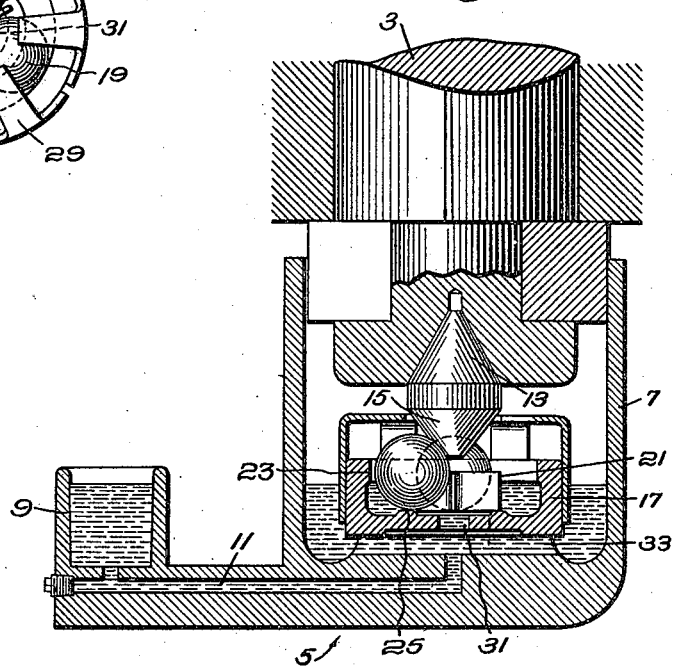
Inventor:
Carl G. Osteman, Patented July 8, 1924.

1,500,523

UNITED STATES PATENT OFFICE.

CARL G. OSTEMAN, OF BOSTON, MASSACHUSETTS, ASSIGNOR TO S. A. WOODS MACHINE COMPANY, OF BOSTON, MASSACHUSETTS, A CORPORATION OF MASSACHUSETTS.

BEARING.

Application filed December 29, 1921. Serial No. 525,691.

*To all whom it may concern:*

Be it known that I, CARL G. OSTEMAN, a citizen of the United States, and a resident of Boston, county of Suffolk, and State of Massachusetts, have invented an Improvement in Bearings, of which the following description, in connection with the accompanying drawings, is a specification, like characters on the drawings representing like parts.

This invention relates to bearings and the object is to provide a strong and efficient end bearing for a rotary shaft which will minimize friction and prevent overheating. Such a bearing finds a particular application in the step of a vertical shaft such, for instance, as the side leg or side cutter head shaft of a matcher or similar woodworking machine. Modern types of woodworking machines run at a high speed and these side heads rotate rapidly and great trouble is caused by overheating of the step bearing which is so great as even to cause fires. At the same time the load on the bearing is heavy and requires a construction of strength and durability.

My invention will best be understood by reference to the following description of the embodiment of my invention shown by way of example in the accompanying drawing which illustrates an organization adapted to the side leg of a matcher or like machine and wherein:

Fig. 1 is a central vertical section through a portion of the shaft and the bearing therefor; and Fig. 2 is a plan of the female portion of the bearing.

Referring to the drawing, I show a portion of the vertically disposed rotary shaft 3 adapted to support the side head of a matcher and which is supported by a step or bracket 5, a portion of which may be shaped as a cylindrical cup 7 partially surrounding the shaft and serving as a container for oil which may be supplied from the oil cup 9 and duct 11. My invention more particularly relates to a ball bearing for supporting the shaft on the step 5.

I preferably mount in a suitable axial recess in the end of the shaft 3 a hard steel toe 13 which may have a conical portion fitting the recess in the shaft and has presented downwardly a lower conical portion 15, the cone being preferably formed with a 90° angle at the apex, which is ordinarily rounded off or truncated as indicated.

The toe is supported on rotary balls and for this purpose I provide a cup-shaped race 17 which may be of restricted diameter and which is substantially filled by the large steel balls 19 which are disposed substantially in mutual contact, being slightly separated in practice by the separator 21 consisting of radiating vanes entering between the balls, and they define between them a recess receiving the coned surface 15 of the toe. The number and arrangement of the balls is such that the diameter of this recess at its point of smallest width, that is, in the plane of the centers of the balls, is less than the diameter of the balls. The balls may be supported at the side of the cup 17 by the raised land 23 which contacts with them at the extremity of the diameter and at the bottom by the land 25. As distinguished from the usual ball bearing the balls 19 are few in number and of relatively great size and preferably I utilize only three as shown, arranged in a generally triangular arrangement as indicated in Fig. 2, and the parts are preferably so proportioned that the apex of the coned surface 15, by which I refer to the geometrical apex which is cut away in the actual construction illustrated, coincides with the plane of the centers of the balls as this provides the most even distribution of pressure. The use of three balls, the minimum number, is of advantage not only in that it permits the use of balls of largest size while keeping the bearing as a whole of the smallest transverse diameter but because the three points tend automatically to center themselves and the wear is distributed evenly and taken up in equal amount by the three elements. This is an application of two principles that three points determine a plane, thus determining the plane of contact of the cone 15 with the balls and also that three points determine a circle since any section of the cone 15 is a circle. Constant and equal contact of the balls with the cone 15 is thereby assured.

Preferably the cup 17 is made separate from the step 5 and to permit the bearing to be handled I may clamp around the cup 17 a strip 27 having arms 29 bent inwardly over the face of the balls to prevent them from falling out. The toe of the shaft enters freely between these arms. If the race 17 is introduced into the cup-like portion 7 of the step 5 and rests on the bottom thereof, which is perpendicular to the axis of the shaft, it will be automatically positioned and centered.

Preferably I utilize the separator member 21 with its radiating vanes to circulate oil through the bearing and for this purpose the bottom of the cup may be provided with an opening 31 communicating with the oil supply in the container 7 and herein the race 17 rests on raised portions in the bottom of the container 7 which define a groove 33 communicating with the opening 31. The vanes 21 of the separator rotating above the opening 31 act in the manner of a pump to circulate oil through the bearing.

The bearing herein described differs radically from the customary ball bearing and might be said to be theoretically incorrect in design. Referring to Fig. 1, it will be readily seen that the lands 23 and 25 on which the balls roll are of different circumferences and consequently there must be more or less differential or rubbing motion of the balls in their travel. A conventionally designed ball bearing, however, if it utilizes sufficiently large balls to give the strength required necessitates a raceway of correspondingly great diameter, in fact, much larger than the shaft. The structure is unwieldly and the speed of the balls great. In the present instance the whole bearing is of restricted size and may, as shown, be organized entirely within the overhang of the shaft and at the same time the balls are of large size and can support the work without crushing. The greatest possible surface speed of the balls even on the land 23 would be less than the surface speed of the shaft 3. The actual differential or wearing motion thus takes place very slowly and the bearing is effective to diminish the friction of the rotating shaft and is yet durable and has parts of sufficient size to stand up under the load. The arrangement whereby the separator 21 provides for a constant circulation of oil through the bearing also minimizes the effect of wear on the balls.

The entire bearing element comprising the cup-like race 17 with the group of balls therein and the toe 13 might be considered as a unit and is readily applicable to various shaft installations without substantial change or modification thereof. Thus, in many shafts a recess is found in the end of the shaft designed to receive a single large ball as a bearing therefor and this recess may be utilized to receive the cone 13. As already pointed out, the restricted size of the bearing permits it to be inserted in an organization such as is illustrated in the drawing embodying the part 7 of comparatively small diameter and the three-fold symmetry of the organization is such that the cup-like race 17 may be freely supported on the step 5 without being attached thereto and will be centered and held centered by the operation of the parts.

Having described in detail the particular embodiment of my invention shown by way of example in the accompanying drawing, what I claim as new and desire to secure by Letters Patent I shall express in the following claims.

Claims:

1. In combination with a shaft a step support therefor shaped to contain an oil supply, raised portions on the bottom thereof, a cup-shaped member having a perforated bottom freely resting on the support, a set of balls in the cup, a separator for the balls comprising radiating vanes, and a toe on the shaft entering between the balls.

2. In combination with a shaft a step support therefor shaped to contain an oil supply and presenting interiorly thereof a cup-like race, there being an oil passage opening through the bottom of said race, a set of balls in the cup, a separator for the balls comprising radiating vanes and a toe on the shaft entering between the balls.

3. A bearing for application to shafts comprising an open topped cup having an opening through the bottom, a group of balls bearing on the bottom and sides of the cup substantially filling the cup and providing a toe receiving recess between them and a separator adapted to rotate adjacent said opening and having radiating vanes entering between the balls.

In testimony whereof, I have signed my name to this specification.

CARL G. OSTEMAN.